United States Patent Office 3,324,233
Patented June 6, 1967

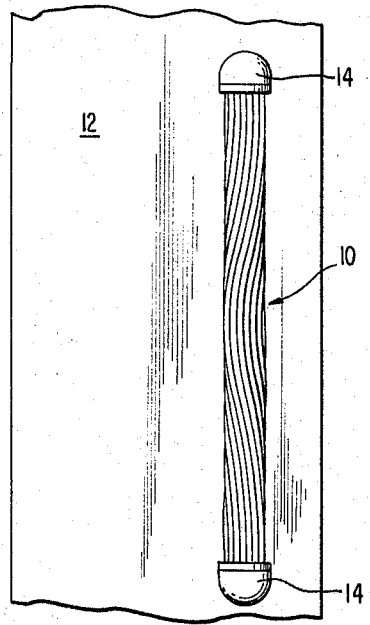
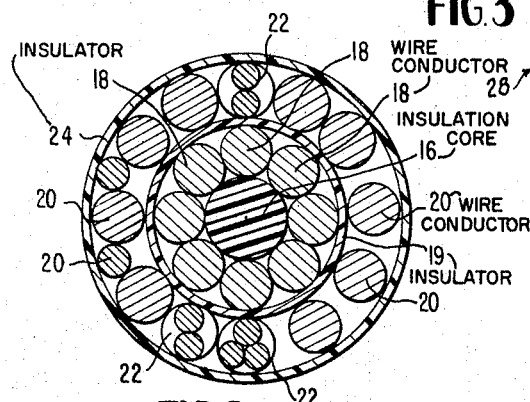
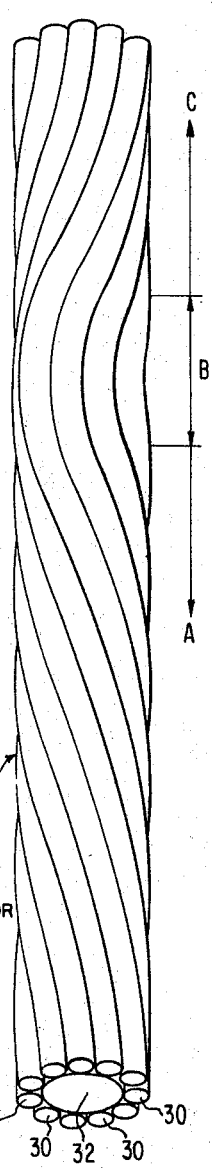
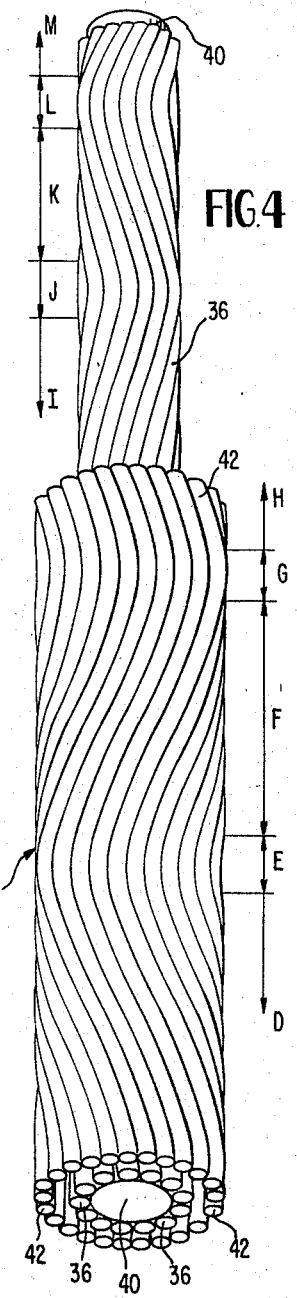
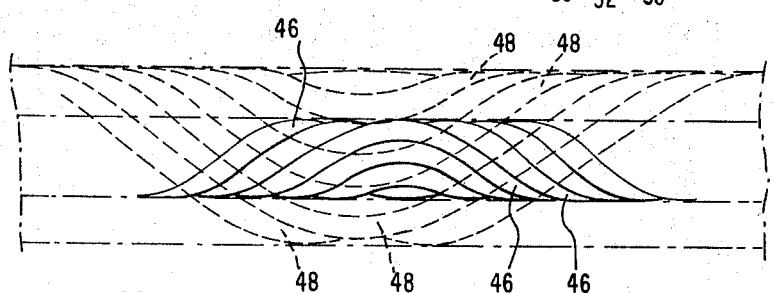

3,324,233
CABLE COMPLEX EMPLOYING STRAND TWIST REVERSAL TO ABSORB LONGITUDINAL EXPANSION
Jack Herman Bryant, Reseda, Calif., assignor to Amphenol Corporation, Broadview, Ill., a corporation of Delaware
Filed Apr. 8, 1965, Ser. No. 446,567
7 Claims. (Cl. 174—131)

This invention is directed to a cable complex, more specifically, to an electrical power and signal distribution cable and to a method of forming such cable so that it may change in length in a straight line between given points, that is to say stretch or shrink longitudinally, without the normal conductive characteristics being effected and without distorting forces being applied to the cable. The cable of this invention has particular application for use in connection with structures subjected to extreme variances in temperature that cause the structure to expand and to contract a considerable extent and wherein the cable is attached to the structure and must change its longitudinal dimension over prescribed distances in response to changes in dimension of the structure. As an example, rocket and missile casings, particularly the fuel cells of the large size types, are subject to considerable changes in dimension. Electrical power and signal distribution cables frequently are attached to such casings at various points and consequently must readily adjust in length to compensate for variances in distances between given points. The requirement for such cable to stretch or shrink easily in its longitudinal direction exceeds the normal flexibility of ordinary cable.

It is the primary object of this invention to provide a cable complex usable as an electrical power and signal distribution cable and also to provide a method of forming such cable that is capable of changing its length over prescribed distances, generally in a straight line, either to a shorter or longer dimension, without a change in the normal conductive characteristics and without subjecting the cable complex to twisting, kinking or distortion.

The cable structure of this invention includes a cable complex built up of a series of separate conduits which are spiral wound lengthwise in both a right-hand lay and a left-hand lay. The separate conduits are assembled loosely so that relative movement between the conduits is possible. This cable complex is to be affixed to a body, such as the fuel cell of a missile, as part of the required electrical control system. Such a body is subject to radical dimensional changes and the cable complex is capable of making the corresponding dimensional changes between the points where the cable complex is fixed. The deflection or differential dimensions under consideration exceed the normal dimensional changes obtainable with a series of conduits extending in parallel fashion in a straight line.

The invention is illustrated in the following drawings in which:

FIGURE 1 is an elevation view, for example, of a cable complex of this invention attached to a body that is subject to changes in dimension;

FIGURE 2 is a cross-section view of a typical cable complex;

FIGURE 3 is a view of a length of a cable complex;

FIGURE 4 is a view of a length of another type of cable complex; and

FIGURE 5 is a diagrammatical representation showing the alignment of the conduits in different layers of a cable complex.

A cable complex 10 of this invention is attached at spaced-apart points to a body 12 that is subject to dimensional changes. The points at which the cable complex 10 are fixed are represented diagrammatically at 14, and may be any suitable connection fixture. At these points 14, forces are applied to the cable complex 10 due to the changes in the spacing between the points. The body may be the jacket or fuel cell of a missile, for example. The points 14 may move away from one another due to expansion of the cell, in which case tension forces will be applied to the cable complex 10, or the points 14 may move toward one another, in which case compression forces are applied to the cable complex 10. The forces, whether tension or compression, are applied axially of the cable complex, that is along the longitudinal axis.

A representative cable complex 10 to which this invention relates is illustrated in cross-section in FIGURE 2 and comprises a core 16, which, for example, may be of silicone. A relatively large diameter core should be used. A number of separate conductors 18 are arranged in a first circumferential layer around the core 16. A wrapping 19 of a tape of polyvinyl chloride, for example, may be applied around the first layer. A number of additional separate conductors 20 are arranged in a second layer coaxially of the first layer. The various separate conductors referred to may themselves be made up of a plurality of separate conductors, as for example the conductors designated 22. These several separate conductors may be any conventional electrical wire or build up cable material required for making the cable complex 10 as necessary for electrical power and signal distribution. The separate conductors shown in FIGURE 2 and the other figures are intended merely to be representative for purposes of illustrating the invention. An outer wrapping 24 also of polyvinyl chloride may be applied to the outer layer of cables. For convenience of illustration, such a wrapping is not shown in connection with the cable complexes of FIGURES 1, 3 and 4. Shielding or jacketing which may be used is not shown.

In order to provide for considerable changes in length, the separate conductors cannot simply be extended in a straight line between their fixed points, fixtures 14, for example; nor can they be assembled in the manner the strands in wire rope are arranged, that is in a uni-directional lay.

A cable complex 28 of this invention is illustrated in FIGURE 3 wherein a single layer of separate conductors 30 are assembled along a core 32 in a left-hand lay designated by arrow A, then extend through a transition zone designated by arrow B where the longitudinal axes of the conductors 30 run for a short distance generally parallel with axis of the core 32, and then extend in a right-hand lay designated by the arrow C. Such a reverse in the lay of all of the conductors between its fixed points, that is a reverse in the twist of the conductors 30 around the core 32, adds significantly to the total length of the conductors and this added length accommodates expansion or stretch in the cable complex. The added length is made useful for this purpose by the lay arrangement, and yet the relative positioning of the separate conductors is not disturbed. The expansion of the cable complex can be entirely longitudinal, that is, in a straight line between points 14 when the points move apart. On the other hand, should the points 14 move closer together following an expansion phase, the cable complex will have straight contraction or shrinkage due to the reverse lay feature.

When expansion of the cable complex takes place, the separate conductors 30 tend to move into a straight line and this occurs without the conductors being twisted or distorted. In addition, when expansion takes place, and also contraction, all of the separate conductors tend to change their position around the core together. This encourages the retention of the normal straight line configuration of the cable complex.

In FIGURE 3 another cable complex 34 is shown, this comprising a first or inner layer of separate conductors 36 on a core 40 and second or outer layer of separate conductors 42 concentrically arranged over the first layer. The outer conductors 42 have left-hand lay zones designated by arrows D and H, transition zones designated by arrows E and G, and a left-hand lay zone designated by arrow F. The inner conductors 36 have right-hand lay zones designated by arrows I and M, transition zones designated by arrows J and L, and a left-hand lay zone designated by arrow K.

Such a series of changes in the lay direction or the twist can be applied as appropriate throughout the length of the cable complex 28 between fixed points in order to achieve the desired amount of stretch. In addition, the pitch of the winding can be varied as desired. The cable complex 34 has a greater pitch than the cable complex 10 and would, therefore, have an ability to expand a greater distance longitudinally. Attention should be given to making the pitches of both the inner layer and the outer layer in cable complex 34 compatible for maximum efficient usage of the conductors. While only two layers have been shown in cable complex 34, it is possible to use more than two layers. The separate conductors should be put together with sufficient clearance between them to allow for ready sliding action of one conductor against the other as between conductors in the same and adjacent layers. In this same regard, the use of a relatively large diameter core allows for provision of a suitable spacing between adjacent conductors which enhances the freedom of movement.

A certain amount of friction can be reduced, thereby assuring the ease with which a two layer cable complex can expand, by eliminating the wrapping 19 around the inner layer of conductors when this might be allowed. The movement of the conductors occurs along the twisted portions as compared with the transition zones. If the transition zones of the outer layer are placed over the transition zones of the inner layers, the respective twisted zones can move together. This is particularly true when a left-hand lay in the outer layer covers a left-hand lay of the inner layer and right-hand lay in the outer layer covers a right-hand lay of the inner layer throughout the cable complex. On the other hand, a certain amount of retention of the alignment of the several conductors in a radial direction can be obtained if the left-hand lay and right-hand lay of the outer lay overlap respectively the right-hand lay and left-hand lay of the inner layer as shown in diagrammatic representation of FIGURE 5, wherein the conductors 46 of the inner layer are shown in full lines and the conductor 48 of the outer layer are shown in broken lines.

The cable complex of this invention is formed by beginning at a prescribed point to extend the separate conductors of a layer of conductors along a core. The several conductors are wound spirally together starting with either a left-hand twist or a right-hand twist as the conductors are run lengthwise of the core. At the desired point, depending on the requirements for the cable complex, the application of the twisting of the conductors is stopped and the conductors are run a distance as predetermined generally parallel with the core. Then, a reverse twist is applied to all the conductors along a continuing length of the cable complex. If the original lay were left-hand, for example, a right-hand lay of the conductors is made, and vice versa. Reversing of the lay direction may be made at selected locations, as appropriate, along the length of the cable complex. Additional layers of separate conductors may be added in the same manner. A left-hand lay of one layer may be made over a left-hand or a right-hand lay of inner layer, or there may be no consideration given to the lay direction of adjacent layers. During the winding, that is the application of lay directions, sufficient space is left between adjacent conductors for subsequent radial movement of the conductors to allow expansion and contraction of the cable complex.

Conventional cable has a lay in one direction only and the ordinary way to accommodate the considerable changes in distance between fixed points such as the points 14 is to loop the cable or use a sufficient length so that the cable is loose and twisted between the points 14. The disadvantages in this are obvious and well known. The cable complex of this invention and the method of making up the cable provide considerable advantages which overcome the drawbacks previously encountered with conventional cable.

While the invention has been described in certain embodiments, variations and changes may be made without departing from the invention as set forth in the following claims.

I claim:
1. In combination, a body subject to changes in dimension, and a cable complex fixed to the body at spaced-apart points over a portion of the body which is subject to changes in dimension wherein said points are subject to move closer together or farther apart, said cable complex disposed substantially in a straight line between said points and comprising a cylindrical insulating core, a series of separate conductors arranged in a circumferentially disposed layer about said core, said conductors having a right-hand lay and a left-hand lay between the points where the cable is fixed to the body so that the cable can stretch and shrink upon changes in spacing between said points and retain the substantially straight line disposition.

2. The combination defined in claim 1 wherein said core of flexible material inside and concentric with said layer of conductors has a diameter sufficient to provide spacing between individual ones of said conductors to enhance elongation and contraction of said cable.

3. The combination defined in claim 1 wherein said cable complex comprises a second series of separate conductors disposed in a circumferential layer concentric with the first layer, said second series of conductors having a right-hand lay and a left-hand lay between the points where the cable is fixed to the body.

4. The combination defined in claim 3 wherein the left-hand lay of the first series of cables overlaps the right-hand lay of the second series of cables and the right-hand lay of the first series of cables overlaps the left-hand lay of the second series of cables.

5. A cable for use in systems requiring substantial longitudinal elongation and contraction without impairing the normal conductive characteristics of the cable comprising: a cylindrical insulating core of flexible material, a first series of separate electrical conductors disposed about said core in a circumferential layer, said conductors having a right-hand lay throughout one length of the cable and a left-hand lay throughout another length of the cable so that the cable may be substantially changed in length upon the application of stress.

6. The cable defined in claim 5 wherein the diameter of said core is of a magnitude sufficient to allow space between said conductors in order to allow substantial elongation and contraction of the cable length.

7. The cable defined in claim 5 and further comprising a second series of separate electrical conductors disposed in a layer concentric about the first layer, said second series of electrical conductors having a right-hand lay throughout a length of the cable and a left-hand lay throughout another length of the cable so that the length of the cable may be substantially changed upon the application of stress.

References Cited

UNITED STATES PATENTS

| 2,759,990 | 8/1956 | Bean | 174—113 X |
| 2,968,691 | 1/1961 | Canfield | 174—113 X |
| 3,017,450 | 1/1962 | Crosby et al. | 174—34 |
| 3,025,656 | 3/1962 | Cook | 57—34 |
| 3,187,495 | 6/1965 | Christian | 174—34 X |

LEWIS H. MYERS, *Primary Examiner.*

H. HUBERFELD, *Assistant Examiner.*